United States Patent

[11] 3,582,975

[72] Inventor Ernam F. King
Allentown, Pa.
[21] Appl. No. 817,091
[22] Filed Apr. 17, 1969
[45] Patented June 1, 1971
[73] Assignee Bell Telephone Laboratories, Incorporated
Murray Hill, Berkeley Heights, N.J.

[54] GATEABLE COUPLING CIRCUIT
10 Claims, 5 Drawing Figs.

[52] U.S. Cl. .......... 307/251,
307/221, 307/246, 307/279, 307/304, 307/315
[51] Int. Cl. .......... H03k 17/00
[50] Field of Search .......... 307/205,
221, 238, 246, 251, 279, 304, 315

[56] References Cited
UNITED STATES PATENTS

| | | | |
|---|---|---|---|
| 3,168,649 | 2/1965 | Meyers | 307/221 |
| 3,395,290 | 7/1968 | Farina et al. | 307/205X |
| 3,440,444 | 4/1969 | Rapp | 307/205X |
| 3,483,400 | 12/1969 | Washizuka et al. | 307/221X |
| 3,509,379 | 4/1970 | Rapp | 307/279 |
| 3,521,141 | 7/1970 | Walton | 307/251X |
| 3,524,996 | 8/1970 | Raper et al. | 307/251 |

*Primary Examiner*—Stanley T. Krawczewicz
*Attorneys*—R. J. Guenther and Arthur J. Torsiglieri

ABSTRACT: Circuit module for gateably coupling digital signals between two or more circuit nodes provides increased speed. A first field effect transistor and a bipolar transistor in a modified Darlington connection provide current gain in the direction of signal transfer for facilitating the transfer of a positive signal. A shunt field effect transistor, having its gate electrode electrically common with the gate electrode of the first field effect transistor, is connected between the transfer path and ground to facilitate transfer of a negative signal.

INVENTOR
E. F. KING
BY
A.J. Torsiglieri
ATTORNEY

GATEABLE COUPLING CIRCUIT

GOVERNMENT CONTRACT

The invention herein claimed was made in the course of, or under contract with the Department of the Army.

BACKGROUND OF THE INVENTION

1. Field of the Invention

This invention relates generally to semiconductor circuits of the digital type which employ combinations of bipolar transistors and field effect transistors; and, more particularly, to an improved means for gateably coupling digital signals between two or more points in such circuits.

2. Description of the Prior Art

In a variety of circuit applications there is a requirement for gateably coupling two or more circuit points together, e.g., between stages of a shift register. Inherent in the transfer of a digital signal from one circuit point to another is the concomitant charging and discharging of charge storage elements (generically, capacitances) associated with each circuit point. Thus in high speed circuits, it is desirable to provide a coupling means adapted for reducing the time required to charge or discharge the circuit points.

In shift registers made up of field effect transistors the objective is to transfer a digital signal from the output node of one stage to the input or gate electrode of a field effect transistor in the next stage. Thus, the transfer of a digital signal from one stage to the next involves charging or discharging the capacitance associated with that gate electrode.

U.S. Pat. No. 3,393,325, issued July 16, 1968 to D. R. Borror et al., and U.S. Pat. No. 3,395,292, issued July 30, 1968 to H. Z. Bogert disclose techniques believed to be representative of prior art approaches to gateable coupling. Both uses simply a field effect transistor having source connected to one circuit point and drain connected to the other. Depending on the potential applied to the gate electrode, the two circuit points are alternately connected by a high and a low impedance.

SUMMARY OF THE INVENTION

My invention comprises a gate-controlled circuit module which provides current gain for charging capacitances associated with the circuit point to which a signal is being transferred and which provides a low impedance shunt discharge path for discharging those capacitances.

More specifically my invention comprises a first field effect transistor (FET) connected drain-to-base in Darlington fashion with a bipolar transistor to provide the current gain. A second FET is connected in shunt with the Darlington pair to provide the low impedance for discharging the circuit point. The gain of the shunt FET is made less than the gain of the Darlington pair so that both FET's may have a common gate electrode and thereby may be gated on simultaneously.

In a particular embodiment of this invention, the coupling module is connected between cascaded single-bit delay stages of a dynamic shift register. The source electrode of the first FET is connected to the output node of one stage, and the emitter of the bipolar transistor is connected to the gate of an FET in the next stage and to the drain of the shunt FET. The gate of the shunt FET is connected to the gate of the first FET and to a common terminal so that both can be switched on simultaneously.

In operation, a synchronous timing pulse is applied to the common terminal turning on both FET's. If a positive signal is present to be transferred from the one stage to the next, the gain of the Darlington pair provides an amplified amount of current to the gate of the next stage to speed up the charging of capacitance associated therewith. If a negative signal is to be transferred, the Darlington pair does not conduct and the shunt FET speeds up the discharge of the capacitance of the next stage.

In another embodiment, two of the circuit modules are connected together to allow selectively shifting a signal to the right or to the left.

In still other embodiments, the circuit module is connected between stages of a static shift register for improved gated coupling therebetween.

It will be appreciated that a device with the aforementioned improved gated coupling characteristics is one of general applicability in the circuit art, both for analog and for digital applications.

BRIEF DESCRIPTION OF THE DRAWING

The invention will be better understood from the following more detailed description taken in conjunction with the drawing, in which.

DETAILED DESCRIPTION

To simplify and to enhance the clarity of the following detailed description, the field effect transistors will be presumed to be P-channel insulated gate field effect transistors (IGFET's) and the bipolar transistors will be presumed to be NPN transistors. It will be appreciated by those in the art that analogous circuits and integrated circuit structures may be formed using analogous combinations of N-channel IGFET's and PNP bipolar transistors or junction field effect transistors and bipolar transistors.

As used in this disclosure, a P-channel IGFET comprises a pair of spaced-apart zones (source and drain) of P-type semiconductivity disposed adjacent the surface of a region of otherwise N-type semiconductivity. A thin dielectric layer is disposed over the space between the source and drain; and a conductive gate electrode overlies the dielectric. The device is considered to be turned on when a voltage is applied to the gate electrode so as to invert the portion N-type semiconductivity between the spaced-apart zones to P-type semiconductivity. This converted portion is termed the P-type channel. In the absence of such a voltage, the source and drain zones are separated by a region of opposite type conductivity. In this state, current flow between them will be extremely small, e.g., in the order of picoamperes.

For the purpose of clarity it will be understood that the terms source and drain are functional terms and that for the type of IGFET's described hereinbelow the terms are interchangeable. More specifically, the source is considered to be the zone from which the P-type charge carriers flow and the drain is defined to be the zone to which they flow. Accordingly, the terms source and drain may be interchangeably applied to the spaced-apart P-type zones depending upon the polarity of voltage applied thereto.

Figure 1:
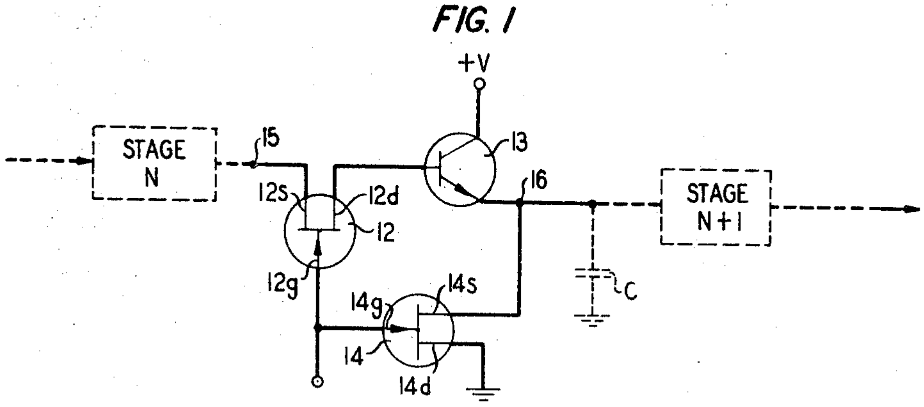
FIG. 1 shows in schematic circuit form an exemplary gated coupling module in accordance with this invention.

With reference now to the drawing, in FIG. 1 there is shown a gateable coupling module in accordance with the present invention as it appears between two successive storage stages. As shown, the coupling module comprises a first IGFET 12 connected drain-to-base in Darlington fashion with a bipolar transistor 13. The collector of the bipolar transistor 13 is connected to a positive voltage source (+V). The emitter of bipolar transistor 13 is connected to the source electrode 14*s* of a shunt IGFET transistor 14 and to a common output terminal 16. The source electrode 12*s* of the first IGFET 12 is connected to an input terminal 15. The drain electrode 14*d* of the shunt IGFET 14 is connected to an electrical ground. The gate electrode 12*g* of IGFET 12 and the gate electrode 14*g* of IGFET 14 are connected together and to a common terminal adapted for connection to a source of synchronous timing pulses Φ. Capacitor C, shown connected between output terminal 16 and ground, represents a combination of the following: the input capacitance associated with the stage N+1; and any parasitic capacitances associated with the connection between terminal 16 and stage N+1.

In operation, a voltage Φ, applied to gate electrodes 12*g* and 14*g*, is normally maintained during standby periods at a positive voltage sufficient to keep these two IGFET+s in the nonconducting state.

To transfer a signal from input terminal 15 to output terminal 16, voltage Φ is lowered to near ground potential so that IGFET's 12 and 14 are turned on. If the signal at terminal 15 is a logical 1, e.g., positive voltage, current flows through the source-drain circuit of IGFET 12 and to the base electrode of bipolar transistor 13. Transistor 13 begins conducting and supplies an amplified replica of the signal to terminal 16 for charging up the input of stage N+1. Of course, shunt transistor 14 is also turned on and is shunting signal current away from terminal 16. However, because of the current gain provided by transistor 13, the shunt effect of IGFET 14, if properly designed, is insignificant.

On the other hand, if the signal at terminal 15 is a logical 0, e.g., negative voltage, the base-emitter junction of transistor 13 cannot become forward-biased and no current flows from terminal 15 to terminal 16. If the voltage at terminal 16 was at a positive level (logical 1,) the transfer of this logical 0 must necessarily result in the discharge of that positive level. In this case, shunt IGFET 14 conducts current from terminal 16 to ground to speed up the discharge of that signal. If the voltage at terminal 16 was previously at a low level, no significant change in the voltage on that terminal occurs.

Figure 2:
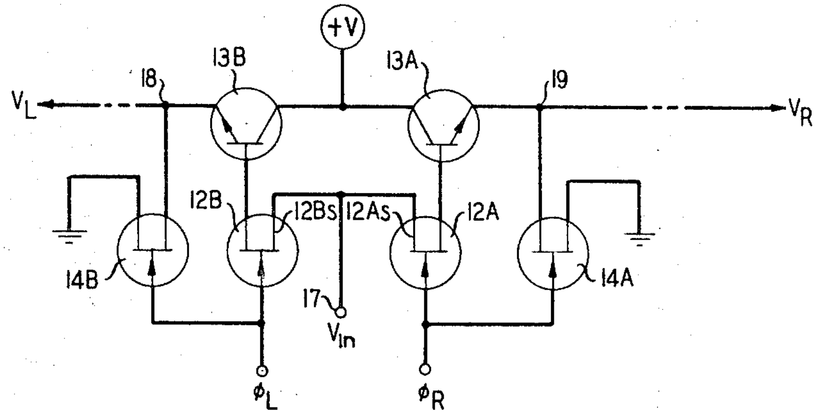
FIG. 2 shows in schematic circuit form two of the circuit modules of FIG. 1 connected together to enable shifting signals to the right or to the left.

In another embodiment of this invention, shown in FIG. 2, two of the modules shown in FIG. 1 are connected together back-to-back to enable selectively shifting a signal in either of two directions, e.g., to the right or to the left. The circuit of FIG. 2 contains two identical halves, and corresponding elements in each half are designated with the same reference number suffixed by an A or a B.

In operation, an incoming signal $V_{IN}$ may be applied to input terminal 17 which, in turn, couples the input signal to the source electrode 12B*s* of IGFET 12B and to the source electrode 12A*s* of IGFET 12A. If a timing pulse $\Phi_R$ is applied to the gate of IGFET 12A concurrently with the application of the input signal, that signal will be transferred through bipolar transistor 13B to terminal 19. This can be considered a shift to the right. Symmetrically if a timing signal $\Phi_L$ is applied to the gate of IGFET 12B simultaneous with the application of the input signal to terminal 17, that input signal will be transferred through transistor 13B to terminal 18. This can be considered a shift to the left.

Figure 3:
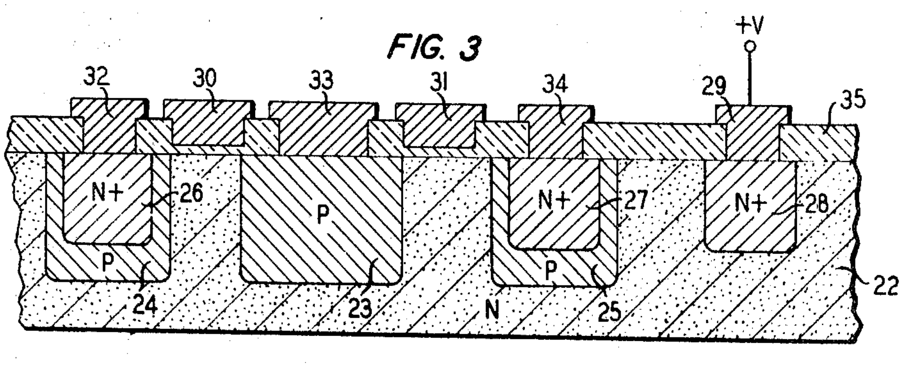
FIG. 3 shows a cross-sectional view of an advantageous structural embodiment of a portion of the circuit in FIG. 2.

FIG. 3 shows a cross-sectional view of an advantageous integrated circuit structural embodiment of a portion of the shift right, shift left circuit module shown in FIG. 2. More specifically, FIG. 2 shows a portion 21 of a semiconductor wafer which can be fabricated readily in any of a variety of ways known for semiconductor integrated circuits. Wafer 21 comprises an N-type bulk portion 22 containing a pattern of localized zones. P-type localized zone 23 simultaneously provides the source of IGFET 12A and the source of IGFET 12B. This is possible because these two sources are electrically common, as shown in FIG. 2. P-type localized zone 24 simultaneously provides the drain for IGFET 12B and the base for bipolar transistor 13B. Similarly, P-type localized zone 25 simultaneously provides the drain for IGFET 12A and the base for bipolar transistor 13A. $N^+$-type localized zone 26 provides the emitter for transistor 13B, and $N^+$ localized zone 27 provides the emitter for transistor 13A. $N^+$-type localized zone 28 facilitates a low resistance contact between metallic electrode 29 and the N-type semiconductive bulk portion 22. It will be appreciated that N-type bulk portion 22 simultaneously provides both collectors for transistors 13A and 13B and a substrate for IGFET's 12A and 12B. Electrode 30 disposed over the space between zones 23 and 24 provides the gate electrode for IGFET 12B, and metallic electrode 31 disposed over the space between P-type zones 23 and 25 provides the gate electrode for IGFET 12A. Insulating layer 35 is a passivating, insulating layer and generally will be thinner underneath the gate electrodes than over the rest of the semiconductive portion. Metallic electrodes 29,32, 33, and 34 provide low resistance electrical contact to the respective zones with which they are contiguous.

It will be appreciated that the cross section in FIG. 3 does not show specifically any portion of shunt transistors 14A and 14B, shown in FIG. 2. This is because they may be fabricated in the semiconductive wafer by any of a variety of ways well known in the art. The cross section of FIG. 3 was selected to show the peculiarly compact way in which the IGFET's 12A and 12B and bipolar transistors 13A and 13B may be included because of their unique, fixed interconnection.

Although it is believed that once having seen the structure in FIG. 3 it will be apparent to those skilled in the art how to fabricate it, a few particular fabrication details are as follows. The P-type localized zones may be either diffused or ion implanted or may be fabricated by any of a variety of processes well known for altering the semiconductivity of a semiconductive wafer. In a typical embodiment, the P-type zones were formed by solid-state diffusion of boron to a depth of about 1.5 microns and with a surface concentration of about $10^{18}$ atoms per cubic centimeter. $N^+$-type emitter zones 26 and 27 and collector contact zone 28 were diffused using phosphorus to a depth of about 1 micron and with a surface concentration of greater than about $10^{20}$ atoms per cubic centimeter. The dielectric material under gate electrodes 30 and 31 included a dual layer including about 500 Angstroms of aluminum oxide and an additional 500 Angstroms of silicon oxide.

A variety of arrangements may be adopted for accomplishing actual electrical contact to the semiconductor zones and for accomplishing the interconnection of integrated arrays of functional elements; a particularly advantageous technique includes the use of a beam lead technology such as disclosed in U.S. Pat. No 3,335,338 to M. P. Lepselter.

Figure 4:
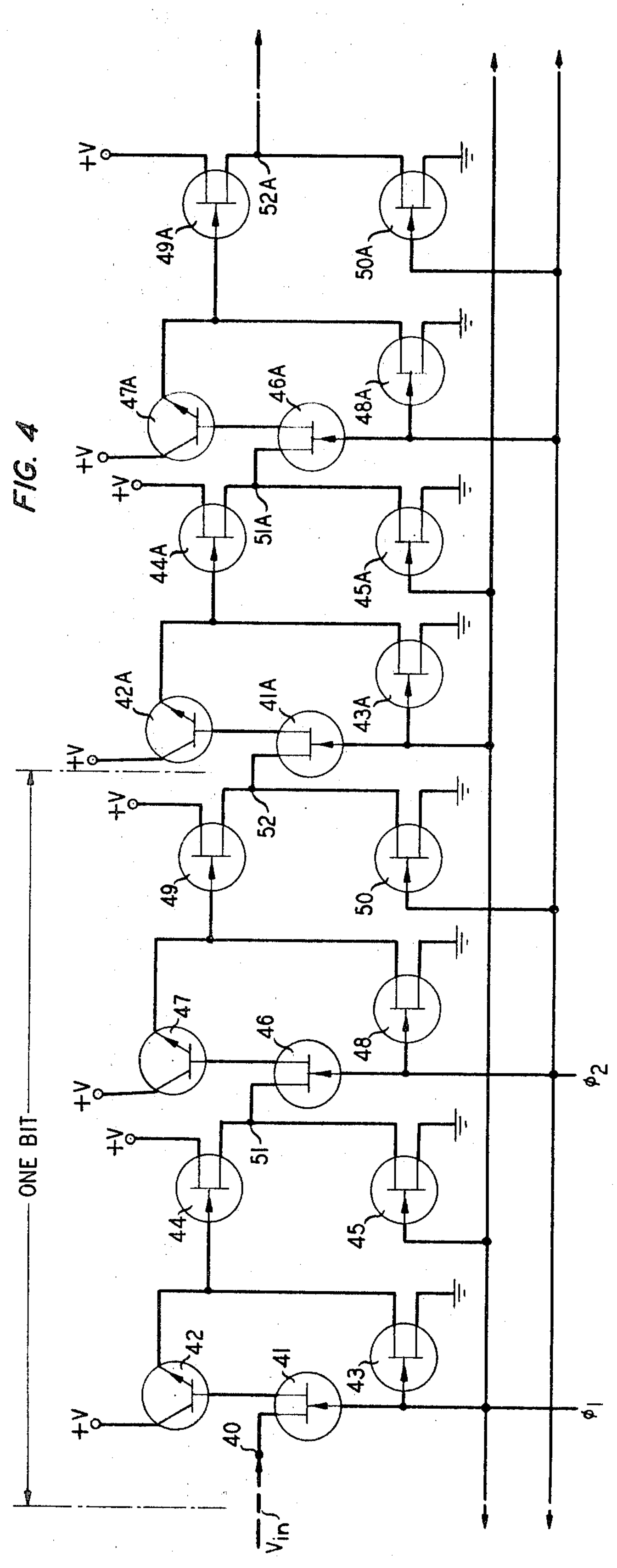
FIG. 4 shows in schematic circuit form a dynamic shift register in accordance with this invention employing the circuit module of FIG. 1 for coupling between stages.

FIG. 4 shows two successive stages of a dynamic shift register which comprises a plurality of cascaded identical stages and which employs the gated coupling circuit module of FIG. 1 between stages in accordance with the principles of this invention. Dynamic shift registers of this general type, but without the improved gated coupling means, are disclosed in the U.S. Pat. No. 3,395,292, issued July 30, 1968 to H. Z. Bogert.

Figure 4A:
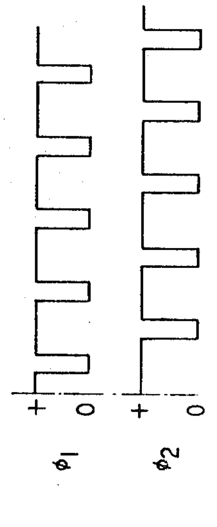
FIG. 4A shows a timing diagram for the synchronous timing pulses to be applied to the circuit of FIG. 4.

Inasmuch as the interconnection and operation of the two successive stages are identical, only the first stage will be described in detail. Circuit elements in the second stage which correspond to those in the first stage will be designated with the same reference numeral but with a suffix A. FIG. 4A shows a waveform diagram for timing pulses $\Phi_1$ and $\Phi_2$ which are applied to the circuit of FIG. 4 to effect synchronous operation.

Each single bit delay stage actually consists of two identical half-stages having gated coupling therebetween. Each half-stage provides digital storage. A single bit delay stage comprises two of the so-called half-stages because two are needed for the storage of a single bit so that race conditions can be avoided. This will become more clear hereinbelow.

As shown in FIG. 4, the first half-stage includes a gated coupling portion comprising transistors 41, 42, and 43 and a storage portion comprising IGFET's 44 and 45 which are connected in series source-to-drain between electrical ground and a source of positive voltage. Similarly, the second half-stage includes a gated coupling portion comprising transistors 46, 47, and 48, and a storage portion comprising IGFET's 49 and 50 which are connected in series source-to-drain between electrical ground and the source of positive voltage. The common source-drain connection of each storage portion is connected to the source electrode of the input IGFET in the next coupling portion.

For simplicity of explanation, assume all IGFET's have gain factors of about 20 microamperes per square volt and that the current gain of each of the bipolar transistors is about 15. In this case, it will be appreciated that the shunting effect of IGFET's 43 and 48 will be more than an order of magnitude down from the transfer factor of the transverse signal path.

In operation, a negative going timing pulse $\Phi_l$ turns on IGFET's 41, 43, and 45. If, while $\Phi_1$ is negative, a positive input signal $V_{IN}$ is applied through electrode 40 to the source of IGFET 41, an amplified replica of $V_{IN}$ is transferred through IGFET 41 and bipolar 42 to the gate electrode of IGFET 44. In this manner the gate electrode of IGFET 44 is charged above a threshold voltage level which turns IGFET 44 off. As IFGET 44 turns off, IGFET 45 conducts current and discharges node 51 to near ground level.

On the other hand, if a negative input signal is applied to electrode 40 while $\Phi_l$ is negative, bipolar transistor 42 cannot conduct because its base-emitter junction is not forward-biased. In this case, shunt IGFET 43 discharges the gate electrode of IGFET 44, which turns IGFET 44 on. Accordingly, the voltage at node 51 rises to near the source voltage (+V).

After a signal has been transferred in the above-described fashion from node 40 to node 51, the $\Phi_l$ voltage is switched back to the positive level prior to the occurrence of a negative going $\Phi_2$ pulse and, accordingly, all IGFET's are off during the time between the two pulses. Because of the capacitances associated with each circuit node and because of small device leakage currents (typically less than 1 nanoampere), the charge on each circuit node can be held essentially unchanged for several microseconds or more.

For the purpose of continuing the description of the operation now, assume node 51 was near ground level when $\Phi_1$ was switched from negative to positive. Then, as the $\Phi_2$ pulse is switched negative, IGFET's 46, 48, and 50 turn on, but since node 51 is low (near ground level). IGFET 46 does not conduct and, therefore, bipolar transistor 47 does not conduct. Accordingly, the circuit node associated with the gate electrode of IGFET 41 is discharged to near ground level through shunt IGFET 48. When the gate electrode of IGFET 49 is near ground level that IGFET is turned on; and a current flows from the positive source +V through IGFET's 49 and 50, and because of the resistance in IGFET 50 the voltage on node 52 rises to some positive level between electrical ground and +V. As the $\Phi_{2\ l}$ pulse returns to its positive level, IGFET 50 turns off, and node 52 is rapidly charged to near the +V level in preparation for the occurrence of the next $\Phi_1$ pulse.

It should be evident now that upon the occurrence of the next $\Phi_1$ pulse, IGFET's 41A, 43A, and 45A turn on and the positive voltage level at node 52 is coupled to the gate electrode of IGFET 44A in the same fashion as the positive voltage level $V_{IN}$ initially at node 40 was coupled to the gate electrode of IGFET 44.

From the foregoing, it will be apparent that after application of a $\Phi_l$ pulse and a $\Phi_2$ pulse, the digital signal at input terminal 40 has been transferred to output terminal 52 of the single bit delay stage. During succeeding cycles of the $\Phi_1$ and $\Phi_2$ timing pulses other logic data signals can be applied to the input terminal 40 and will thereupon be propagated in clocked synchronism through the shift register in the manner well known in the art.

Although the invention has been described with respect to certain specific embodiments, it will be understood that modifications and variations of the invention may be resorted to without departing from the spirit and scope of the invention.

For example, it will be apparent that the shift right, shift left coupling module of FIG. 2 may be included in a dynamic shift register of the general type shown in FIG. 4 to enable dynamic shift register operation with shift right, shift left capability. Of course, a separate pair of timing pulses, e.g., $\Phi_{1R}$ and $\Phi_{2R}$ will be required for shifting to the right; and a separate pair of timing pulses, e.g., $\Phi_{1L}$ and $\Phi_{2L}$ will be required for shifting to the left.

Further, it will be apparent that either the unidirectional coupling module shown in FIG. 1 or the bidirectional coupling module shown in FIG. 2 may be advantageously employed in static shift registers. In that event, each identical half of a singe bit delay stage would comprise a gated coupling module driving a first flip-flop. The successive half-stage would, of course, include a second gated coupling module driven by the first flip-flop and driving a second flip-flop. Data would be propagated through the static flip-flop in synchronous fashion with the application of $\Phi_1$ and $\Phi_2$ timing pulses to the coupling modules associated with the successive half stages.

I claim:

1. Apparatus for gateably coupling electrical signals between at least a first circuit node and a second circuit node comprising:
 serial means which provides current gain between the two nodes; and
 shunt means connected between the second node and a reference potential;
 said serial means interconnected with said shunt means so that both are gated on simultaneously and gated off simultaneously;
 said serial means being related to said shunt means such that the current gain of said serial means is greater than the current gain of said shunt means;
 said serial means facilitating the transfer of a signal which tends to charge capacitances associated with the second circuit node; and
 said shunt means facilitating the transfer of a signal which tends to discharge capacitances associated with the second circuit node.

2. Apparatus as recited in claim 1 wherein said serial means comprises an FET and a bipolar transistor connected so that the source-drain circuit of the FET is in series with the base-emitter junction of the bipolar transistor.

3. Apparatus as recited in claim 1 wherein said serial means consists of an FET and a bipolar transistor connected in series so that the source-drain circuit of the FET is in series with the base-emitter junction of the bipolar transistor.

4. Apparatus as recited in claim 1 wherein said shunt means comprises an FET having source electrode connected to said second circuit node and drain electrode connected to a terminal means for connecting to said reference potential.

5. Apparatus as recited in claim 2 wherein said shunt means comprises an FET having source electrode connected to said second circuit node and drain electrode connected to a terminal means for connecting to said reference potential.

6. Apparatus as recited in claim 1 wherein said serial means comprises a first IGFET and a bipolar transistor connected so that the source-drain circuit of the IGFET is in series with the base-emitter junction of the bipolar transistor; and said shunt means comprises a second IGFET having its gate electrode connected to the gate electrode of the first IGFET.

7. In combination,
 gateable coupling apparatus in accordance with claim 1;
 a first digital storage circuit, the output node of which is connected to said first circuit node; and
 a second digital storage circuit, the input node of which is connected to said second circuit node.

8. A shift register stage of the type including a first digital storage portion and a second digital storage portion,
 wherein the improvement comprises:
 improved gateable coupling means connected between the output of the first portion and the input of the second portion;
 said coupling means including
 a serial portion for providing current gain from said output to said input for facilitating transfer of a signal which tends to charge said input; and
 a shunt portion connected between said input and a reference potential for facilitating transfer of a signal which tends to discharge said input; and said serial portion and said shunt portion being interconnected so that both are gated on simultaneously and gated off simultaneously.

9. A shift register including gated coupling means between at least two stages, characterized in that the gated coupling means includes
first and second field effect transistors (FET's); and
a bipolar transistor;
means for connecting the source electrode of the first FET to the output of a first stage;
means connecting the drain electrode of the first FET to the base electrode of the bipolar transistor;
means connecting the gate electrode of the first FET to the gate electrode of the second FET;
means for connecting the collector electrode of the bipolar transistor to a terminal adapted for connection to a source of electric power;
means for connecting the gate electrodes of the FET's to a terminal adapted for connection to a clocked control potential;
means for connecting the drain electrode of the second FET to a terminal adapted for connection to a reference potential; and
means for connecting the emitter of the bipolar transistor to the input of a second stage.

10. A shift register as recited in claim 11 further characterized in that the FET's are insulated gate field effect transistors (IGFET's).